(No Model.) 2 Sheets—Sheet 1.
A. P. GRAHAM & S. T. PEARSONS.
BICYCLE STAND.
No. 592,544. Patented Oct. 26, 1897.
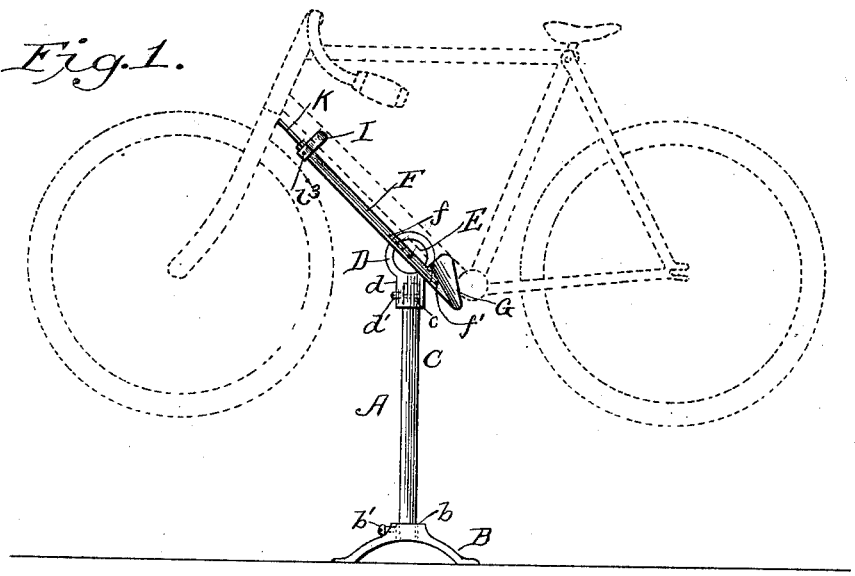
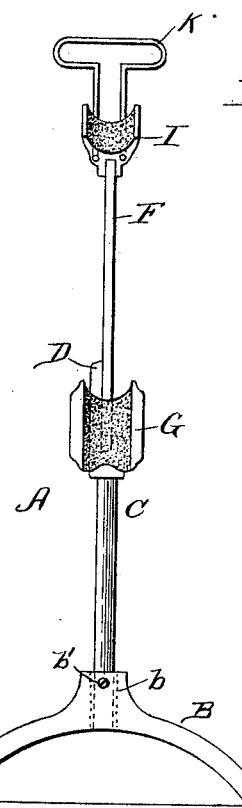
WITNESSES
INVENTORS:
Archibald P. Graham
Samuel T. Pearsons
By C. S. Watton Attorney (No Model.) 2 Sheets—Sheet 2.

A. P. GRAHAM & S. T. PEARSONS.
BICYCLE STAND.

No. 592,544. Patented Oct. 26, 1897.

WITNESSES
A. B. Driggs
Thomas Grant

INVENTORS
Archibald P. Graham,
Samuel T. Pearsons,
by C. A. Walton Attorney

UNITED STATES PATENT OFFICE.

ARCHIBALD P. GRAHAM AND SAMUEL T. PEARSONS, OF RUTLAND, VERMONT.

BICYCLE-STAND.

SPECIFICATION forming part of Letters Patent No. 592,544, dated October 26, 1897.

Application filed May 6, 1897. Serial No. 635,314. (No model.)

*To all whom it may concern:*

Be it known that we, ARCHIBALD P. GRAHAM and SAMUEL T. PEARSONS, citizens of the United States, residing at Rutland, in the county of Rutland and State of Vermont, have invented certain new and useful Improvements in Bicycle-Stands; and we do hereby declare the following to be a full, clear, and exact description of the invention, such as will enable others skilled in the art to which it appertains to make and use the same.

This invention relates to improvements in a support or stand for bicycles.

An object of the invention is to provide such a stand which is simple in construction upon which a bicycle may be easily and quickly placed, and when so placed may be readily adjusted in any desired position.

A further object is to provide such a device which may admit of adjustment to permit any bicycle to be placed thereon and which retains the wheels in the same plane and does not interfere with the free revolving of the wheels for alining, repairing, &c.; and the invention consists of further and more detailed improvements, which will be hereinafter more fully pointed out in the specification and claims.

For a more complete understanding of the invention reference is to be had to the accompanying drawings, wherein corresponding letters indicate like parts in the several views, and in which—

Figure 3:
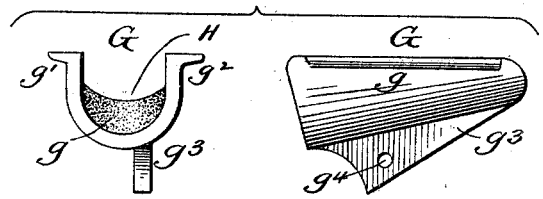
Figure 4:
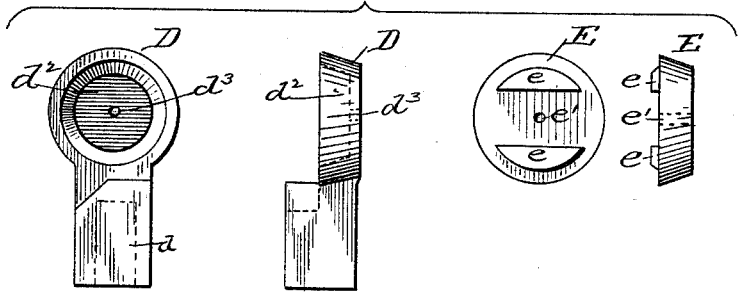
Figure 5:
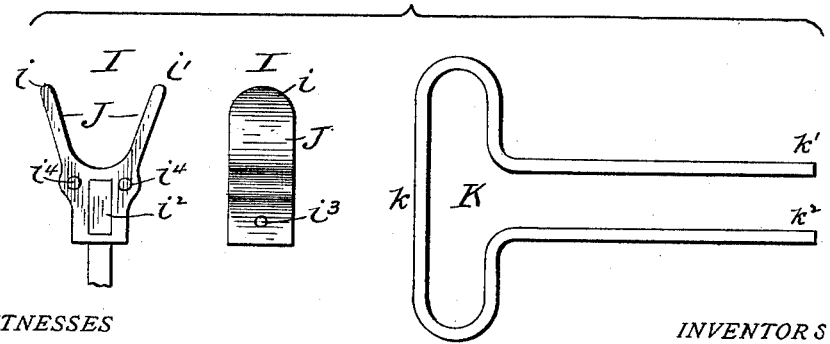

Figure 1 is a view in side elevation of the support, illustrating a wheel in dotted lines resting thereon. Fig. 2 is a front elevation of the support or stand in position to receive a wheel. Fig. 3 represents side and front views of the hub or crank-hanger support secured to the lower end of the slide-bar of the stand. Fig. 4 represents details of the swivel-cap and lock-washer operating in connection therewith. Fig. 5 are details of the top rest and forks-rest for a wheel.

In the drawings, A refers to the stand or support for bicycles, constructed of any suitable material and consisting of a suitable base B, preferably a tripod of cast metal, having a suitable aperture $b$ drilled through its upper central portion for the insertion and adjustment therein of a vertical shaft or standard C by means of a set-screw $b'$ in the upper part of base B, as shown. This shaft C is preferably tubular or rounded and has a horizontal groove $c$ encircling the same near the top thereof. Upon the top of this shaft is a swivel-cap D, the lower part of which is of rounded form and has an opening $d$, which fits over the upper end of the shaft C, and upon its side it is provided with a set-screw $d'$, which engages in the groove $c$ upon shaft C, and thus permits the swivel-cap to revolve thereon, yet prevents the same from coming off. The upper part of this swivel-cap is enlarged and partly cut away and has a socket $d^2$ in its face having beveled sides, as shown, in which fits a lock-washer E, having its sides beveled to correspond with said socket $d^2$, and upon its outer face or top it is provided with two projections or lugs $e$ $e$ near its edges, at points opposite each other, the inner edges of these lugs lying in parallel planes and the distance between the same corresponding to the width of slide-bar F, hereinafter referred to. Apertures $f$ $e'$ $d^3$ are provided through said swivel-cap, lock-nut, and slide-bar for the insertion of a bolt, which in connection with a nut is used to hold these parts together, as hereinafter described.

F is the slide-bar, constructed of any suitable material and being of a width which permits it to be adjusted between the lugs $e$ $e$, it being secured to the face or top of the lock-washer by means of a bolt passing through it and through said washer and the top of the swivel-cap, as before referred to. It is evident by this arrangement that said slide-bar can be adjusted at any angle by simply loosening the bolt and nut and tightening it up again after the adjustment has been made. Upon the lower end of the slide-bar is suitably secured by bolting or otherwise a wedge-shaped hub or crank-hanger support G, having a central round-shaped cavity $g$. Upon the longer upper face are provided outwardly-turned flanges $g'$ $g^2$, as shown, which and the cavity are covered with felt or other suitable covering to prevent the wheel from being scratched or marked when it contacts with the same. This support has a depending flange $g^3$ upon its bottom, which is provided with an aperture $g^4$ for securing it to the lower end of the slide-bar, as before stated.

I is a Y-shaped top rest formed of two arms $i\ i$ and a lower portion apertured at $i^3$ for the insertion of the slide-bar, and $i^3$ is a set-screw passing through one side of the lower portion to impinge upon the slide-bar to retain this top rest at any desired point on the bar. The inner sides of the arms $i\ i'$ are covered with felt or other suitable material for purposes similar to the crank-hanger support, and upon its upper face, near the base of the arms $i\ i'$, are formed two apertures $i^4$ $i^4$, in which are secured or cast with said rest the ends $k'\ k^2$ of a T-shaped wire rest K for the forks of a bicycle, as hereinafter explained.

In the operation of the stand or support the distance between the upper end of the T-shaped wire rest and the crank-hanger support is first regulated to correspond to the distance between the front forks and the crank-hanger of the bicycle to be used. The bicycle is then raised up, with the rear end slightly elevated, and the front forks of the wheel are placed in contact with the front end of the T-shaped wire rest. Then the rear end is lowered until the hub or crank-hanger rests on the inclined surfaces of the crank-hanger support. (See Fig. 1.) It will be seen that the weight of the wheel rests largely upon the rests at the upper end of the slide-bar F, which causes the pressure of the forks on the wire rest to keep the front wheel in alinement with the rear wheel without the use of a supplemental clamp or guide like those on many stands or supports now in use. This important feature leaves the front wheel entirely free to be revolved without friction for exhibition, repair, &c. When the wheel is placed on the support, as described, the wheel becomes securely wedged upon the stand between the upper rests and the crank-hanger support, which obviates the use of other clamps or mechanism such as encumbers other supports.

Having thus described our invention, what we claim, and desire to secure by Letters Patent, is—

1. A bicycle-support comprising a base, a vertical shaft adjustable in said base, a swivel-cap on the top of said shaft, a lock-washer secured to the upper part of said swivel-cap and having a guideway formed on the same, a slide-bar adjustably secured in said guideway and means to clamp said slide-bar at different angles with respect to said shaft, a wedged-shaped support upon the lower end of said slide-bar, rests upon the upper end of said slide-bar to bear against the front forks of the wheel and hold the same in the same plane with the rear wheel and to support the wheel, the crank-hanger being supported and steadied by said wedged-shaped support, substantially as described and set forth.

2. The combination in a bicycle-support of a base, a vertical shaft adjustable in said base, a swivel-cap secured to revolve upon the upper end of said shaft and having an enlarged and recessed upper end, a lock-washer fitting in said recess, and having a guideway formed upon the outer surface of the same, a bar adjustable in said guideway and means to clamp the bar, washer and swivel-cap in any desired position, a support upon the lower end of said bar to support the crank-hanger or hub of a bicycle, and rests upon the upper end of said bar, adjustable thereon, to bear against the front forks of the wheel to keep the wheels in the same plane, and to support the wheel in an upright and steady position in connection with the crank-hanger support, as and for the purposes set forth.

In testimony whereof we affix our signatures in presence of two witnesses.

ARCHIBALD P. GRAHAM.
  SAMUEL T. PEARSONS.

Witnesses:
 CARL B. HUISENAN,
 CARLE H. HAZELTON.